United States Patent
Tchoukaleysky

(10) Patent No.: US 8,988,514 B2
(45) Date of Patent: Mar. 24, 2015

(54) DIGITAL CINEMA ANTI-CAMCORDING METHOD AND APPARATUS BASED ON IMAGE FRAME POST-SAMPLING

(75) Inventor: Emil Tchoukaleysky, Toronto (CA)

(73) Assignee: Thomson Licensing, Issy les Moulineaux (FR)

( * ) Notice: Subject to any disclaimer, the term of this patent is extended or adjusted under 35 U.S.C. 154(b) by 1364 days.

(21) Appl. No.: 12/449,818

(22) PCT Filed: Mar. 6, 2007

(86) PCT No.: PCT/IB2007/000553
§ 371 (c)(1),
(2), (4) Date: Aug. 27, 2009

(87) PCT Pub. No.: WO2008/107731
PCT Pub. Date: Sep. 12, 2008

(65) Prior Publication Data
US 2010/0039568 A1    Feb. 18, 2010

(51) Int. Cl.
*H04N 7/169* (2011.01)
*H04N 5/913* (2006.01)
(Continued)

(52) U.S. Cl.
CPC ............. *H04N 5/913* (2013.01); *H04N 9/3123* (2013.01); *H04N 9/3179* (2013.01);
(Continued)

(58) Field of Classification Search
CPC ... H04N 5/913; H04N 9/3123; H04N 9/3179; H04N 21/41415; H04N 21/4223; H04N 21/4402; H04N 9/3197; H04N 2005/91392; H04N 5/14; H04N 9/64; H04N 5/213; G06T 5/20; G09G 5/36
See application file for complete search history.

(56) References Cited

U.S. PATENT DOCUMENTS 5,619,228 A     4/1997   Doherty
6,539,034 B1 *  3/2003   Shimosaka .................... 370/535
(Continued)

FOREIGN PATENT DOCUMENTS

| EP | 1237369 | 9/2002 |
|---|---|---|
| JP | 2004144907 | 5/2004 |
| JP | 2004214906 | 7/2004 |
| WO | WO0133846 | 5/2001 |
| WO | WO2006025382 | 3/2006 |

OTHER PUBLICATIONS

International Search Report, dated Oct. 4, 2007.

*Primary Examiner* — Christopher S Kelley
*Assistant Examiner* — Mohammed Jebari
(74) *Attorney, Agent, or Firm* — Robert D. Shedd; Jeffrey M. Navon; Catherine A. Cooper

(57) ABSTRACT

A method and apparatus for projecting digital video content and for discouraging recording of the projected video content using a video camera or other sampling recording device are described, including accepting a frame of digital video content, time-shifting a bit-plane of the frame of the digital video content at a phase difference, projecting the time-shifted frame, repeating the accepting, time-shifting and projecting acts for a number of frames, adjusting the phase difference and repeating all of the above acts. Also described are a method and apparatus for generating an indication of a mid-scale level bit-plane of a frame of digital video content, including accepting a frame of digital video content, accepting a selection of mid-scale level bit-plane of the frame and generating an indication of the selection of the mid-scale level bit-plane of the frame. Time-shifting bit-planes of a frame generates in the recorded video a flicker.

14 Claims, 5 Drawing Sheets

(51) Int. Cl.
*H04N 9/31* (2006.01)
*H04N 21/414* (2011.01)
*H04N 21/4223* (2011.01)
*H04N 21/4402* (2011.01)
*G03B 21/32* (2006.01)

(52) U.S. Cl.
CPC ...... *H04N 9/3197* (2013.01); *H04N 21/41415* (2013.01); *H04N 21/4223* (2013.01); *H04N 21/4402* (2013.01); *H04N 2005/91392* (2013.01)

USPC .............................................. 348/61; 352/40

(56) References Cited

U.S. PATENT DOCUMENTS

| | | | |
|---|---|---|---|
| 6,950,532 | B1 | 9/2005 | Schumann |
| 7,646,882 | B2 | 1/2010 | Muratani |
| 8,018,569 | B2 * | 9/2011 | Goodhill et al. ................. 352/40 |
| 2004/0130682 | A1 | 7/2004 | Tomita |
| 2006/0117259 | A1 * | 6/2006 | Nam et al. .................... 715/719 |

* cited by examiner

DIGITAL CINEMA THEATRE SCREEN PICTURE

REPRODUCED DISPLAY PICTURE OF ILLEGAL CAMCORDING

US 8,988,514 B2

DIGITAL CINEMA ANTI-CAMCORDING METHOD AND APPARATUS BASED ON IMAGE FRAME POST-SAMPLING

This application claims the benefit, under 35 U.S.C. §365 of International Application PCT/IB2007/000553, filed Mar. 6, 2007 which was published in accordance with PCT Article 21(2) on Sep. 12, 2008 in English.

FIELD OF THE INVENTION

The present invention relates to anti-camcording of digital cinema image frames in general, and in particular, to digital cinema anti-camcording using image frame post-sampling.

BACKGROUND OF THE INVENTION

Illegal camcording in digital cinema theatres adversely affects the authorship rights of movie creators and the business of production studios and theatre chains. There are different methods to protect against piracy. Some of the protection schemes are annoying for the audience. Other protections schemes, for example those which are laser-based, are dangerous for the movie viewers or have doubtful efficiency.

A safe and efficient method and apparatus for anti-camcording, which creates enough disturbances on the illegal image to be intrusive and yet does not disturb the quality of digital cinema viewing, would be advantageous. The present invention solves the above-identified problems and is safe and non-intrusive.

SUMMARY OF THE INVENTION

The present invention is a digital cinema anti-camcording method and apparatus based on image frame post-sampling. The method and apparatus of the present invention allow operators of feature film digital projection theatres to increase the level of protection against piracy. A video camera, which illegally records/camcords the movie projected on the theatre screen, will record the image content with an invisible artifact. The invisible artifact will become visible when the recorded image frames/pictures/images are reproduced on a video display. As used herein "/", denotes the same of similar components or acts.

The present invention is directed towards protecting the digital cinema content by employing time-shift control of the bit-planes of the digital projector in the theatre. Time-shift control of the digital projector is a post-sampling process. Particularly, the bit-planes related to mid-scale video levels are shifted within one video frame. This creates a time-gap where the illegal recording captures/records/camcords a blank frame for these bit-planes, while the human visual system integrates the gap. Thus, the present invention is safe and non-intrusive and introduces flicker only in the reproduced illegal image.

The method and apparatus of the present invention create a content-related flicker in the reproduced camcorded movie, making it unpleasant and irritating to watch. For best results, the selection of the flicker inducing mid-scale levels in one scene is guided by a human operator during the movie mastering.

A method and apparatus for projecting digital video content are described, including accepting a frame of digital video content, time-shifting a bit-plane of the frame of the digital video content at a phase difference, projecting the time-shifted frame, repeating the accepting, time-shifting and projecting acts for a number of frames, adjusting the phase difference and repeating all of the above acts. Also described are a method and apparatus for generating an indication of a mid-scale level bit-plane of a frame of digital video content, including accepting a frame of digital video content, accepting a selection of mid-scale level bit-plane of the frame and generating an indication of the selection of the mid-scale level bit-plane of the frame.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
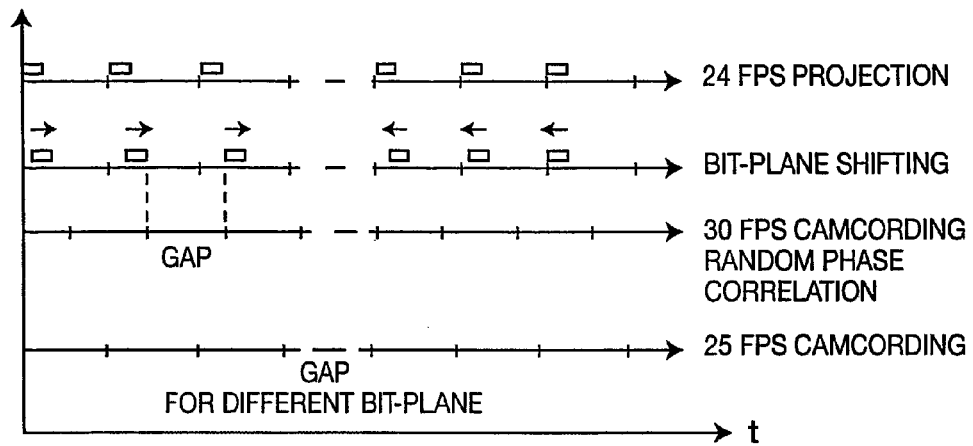
FIG. 1 illustrates the bit-plane shifting method in accordance with the present invention for 24 projections per second.

The method and apparatus of the present invention are designed to improve the technical protection against camcording in digital cinema theatres by applying non-intrusive image processing technology.

There have been a number of attempts to technically prevent video recording in movie theatres. So far there is no recognized technology that satisfies this need. There are three categories of anti-camcording methods, to which the present invention could be compared.

First, there are methods for locating and blinding the camera making the illegal recording/image. These methods use a scanning light beam, transmitted from the main screen area towards the audience and reflected back from shiny objects. Reflections from camera parts and lenses are received and analyzed for detection of the location of the camera making the illegal recording. Once the camera making the illegal recording is detected, a light beam is directed to its lens, obstructing the capture/recordation of the movie. The advantage of this category of methods is rendering the illegally recorded image useless. One disadvantage of the approach is non-conclusiveness in locating the camera in the audience—any shiny object (e.g. earrings) could reflect the light beam. Also, there is a danger the beam may scan eye glasses and thus, may cause injury to a viewer.

Second, there are methods for projecting invisible light from the screen to the whole audience. These methods disturb the acquisition functions of any camera making an illegal recording in the theatre. This approach relies on extended optical sensitivity of the camera making the illegal recording—in ultra-violet and in infra-red directions and the human visual system perception of moving light. The advantage of this category of methods is safety for the viewers. The disadvantage of this category of methods is the possibility of defeating the approach by installing optical color filter in front of the camera lens making the illegal recording to block the throwing light.

Third, there are methods for adding extra frames to the projected image sequence. The extra image frames would become visible in the illegal recorded camera picture. The advantage of this category of methods is that there is no need to install equipment in the digital cinema theatre for anti-camcording protection. The disadvantage is the possibility that some viewers may detect perceptual artifacts (the additional video frames), which are not related to the subject of the movie.

With the advent of digital cinema (DC), watermarking techniques were created. Watermarking detection techniques can identify in what theatre the illegal recording occurred but will not obstruct picture capturing. The difficulties and disadvantages of watermarking techniques arise from the fact that video content viewed in the theatre may be affected by the protecting tools—the picture could be degraded or the audience could be exposed to unwanted light flashing and beaming. This is due to potential perceptual artifacts left by the watermark embedding process.

Significant progress has been made in the domain of digital projection technology, which has become a potential replacement for the classic film projection. Recent research investigated the possibilities of using some features of the digital projector, not available in the traditional film projector. This research resulted in the development of a new barrier against illegal camcording/recording in a movie theatre.

One distinctive feature of digital projectors, based on micro-mirror devices and Digital Light Processing (DLP) technology, is their image bit-plane manipulation. Digital cinema employs 12 bits of quantized digital video. Every image bit is projected by DLP projector for a proportional sub-frame time on the theatre screen. The lesser bits (darker scene objects) are projected for a shorter period of time within a video frame. The most significant image bits (brightest scene objects) are projected for the longest time within the video frame. Thus, the image bit-planes are shaped, altogether creating picture perception within the Human Visual System (HVS).

DLP projectors are capable of reproducing images at different frame rates, or number of projected Frames Per Second (FPS). The DLP projection process allows for smooth changes from one speed to another, e.g. from 24 FPS (classic film rate) to 30 FPS (video rate) to 60 FPS or even higher. Using this option to confuse the illegal camcording has been discussed by others, but the specifications from the Digital Cinema Initiative (DCI) calls for a constant frame rate.

Two approaches were investigated in the development of the present invention:
  linearly changing the projection time position of bit-planes from frame to frame
  selecting appropriate mid-scale video level bit-planes for maximum protection The digital cinema anti-camcording method of the present invention is safe for the theatre audience. The present invention method does not affect perception of the picture and provides indicative artifacts on the illegally recorded image. It does not require installation of any equipment in the theatre.

The prior art in digital cinema anti-camcording technology does not differ significantly from the methods for traditional film-based movie theatre protection. The present invention is based on some particularities of DC projectors and employs digital video processing principles. It is based on the use of DLP projectors, which are currently popular in DC theatres.

The DC specification is based on 12 bit image depth per color. All pixels (picture elements) of one of those 12 bits in a video frame are projected simultaneously on the screen forming a bit-plane. The projected time duration within one frame of one bit-plane defines the perceived brightness for these pixels from the screen. Under the normal projection process, the time position of one bit-plane within the frame does not change.

The present invention method gradually changes the time position of middle scale bit-planes in the forward direction for 0.5 second and returns gradually in the backward direction for the other 0.5 second. The method then repeats. This is denominated Positional Post-Sampling. Image bits are previously sampled during the analog to digital conversion process of movie mastering, which means their values are established. Their time duration for DLP projector is also established. Positional Post Sampling retains the bit-plane values and time duration but manipulates its phase within the frame.

FIG. 1 depicts the process of post-sampling of mid-scale bit-planes to create a frame gap in the captured image sequence. The projection in FIG. 1 is 24 Frames Per Second (FPS).

The top timeline of the time-diagram shows the bit-planes projected in multiple frames in an unprotected manner. The bit-planes retain the same phase-relation to the beginning of every frame.

The second timeline from the top of the FIG. 1 time-diagram shows mid-scale bit-planes projected in the frame sequence after being shifted forward frame by frame by a constant phase offset. Once reaching 0.5 second, the bit-planes are then shifted back and return to their original position at the beginning of the next 0.5 second. That is, the bit-planes are shifted forward in time for 0.5 seconds and then backwards for the next 0.5 seconds returning to their original positions in terms of phase. Thus, the forward and backward process takes a total of one full second to go forward and then backward returning to their original positions in terms of phase. Then the process is repeated for the entire duration of the movie.

The third timeline from the top of the FIG. 1 time-diagram indicates the frame intervals for a camera illegally recording/camcording at 30 FPS (North American Standard). The bottommost timeline of the FIG. 1 time-diagram indicates frame intervals for a camera recording/camcording at 25 FPS (European Standard). Both of these recording speeds are out of phase with the 24 FPS projected frame sequence. Additionally, the bit-plane phase and the bit-plane phase correlation changes from frame to frame using the method of the present invention.

The present invention accelerates this phase difference until at one moment the captured frame contains no middle-scale bit-planes. This is shown on the figure by vertical lines across the time axis (horizontal lines). The missing frame situation repeats every second, which creates flicker in the illegal recorded/camcorded image.

Figure 2:
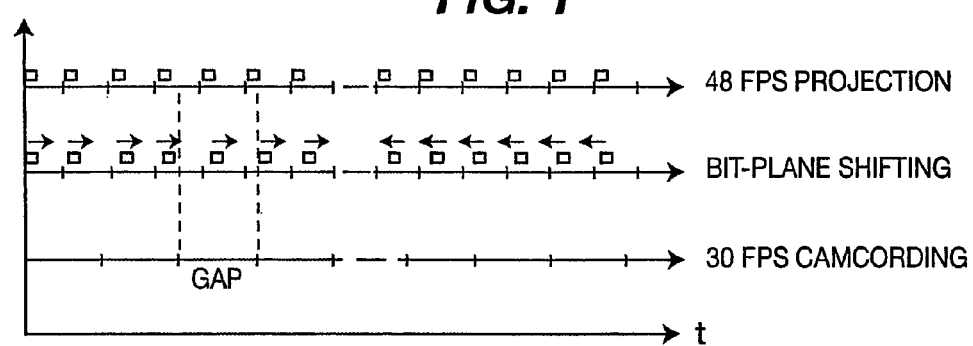
FIG. 2 illustrates the bit-plane shifting method in accordance with the present invention for 48 projections per second.

DC allows projection at higher FPS including 48 FPS. FIG. 2 illustrates the creation of frame gap for different capture formats in this case. The principle remains the same even though the projected bit-planes have half duration and the gap will cause the captured image to miss one of the twice-projected bit-planes. This process repeats at double speed per frame, so the flicker in the HVS will be the same.

Since the frame relation between the projected image and the illegally captured image is unpredictable, there is a need to consider the possibility of different situations. It is assumed that it will be enough to consider six different phase offsets within the range of 0 degrees to 360 degrees based on the flicker creation threshold of 60 degrees.

The phase difference or phase gap between the projected frames and the frames illegally recorded using a video camera could be anywhere between 0 degrees and 360 degrees. The present invention is directed to introducing flickering in these gaps, in order to make the illegal video unpleasant/annoying to watch. Hypothetically, a disturbing flicker could be created for each degree between 0 and 360. However, this is not practical. In an exemplary embodiment, flicker is introduced for six phase differences:

0 degrees
60 degrees
120 degrees
180 degrees
240 degrees
300 degrees and at 360 degrees, which is also 0 degrees in the next cycle of phase differences. The flicker be most perceptible at these points of phase difference between projector and camera, but will also affect the interval therebetween.

Figure 3:
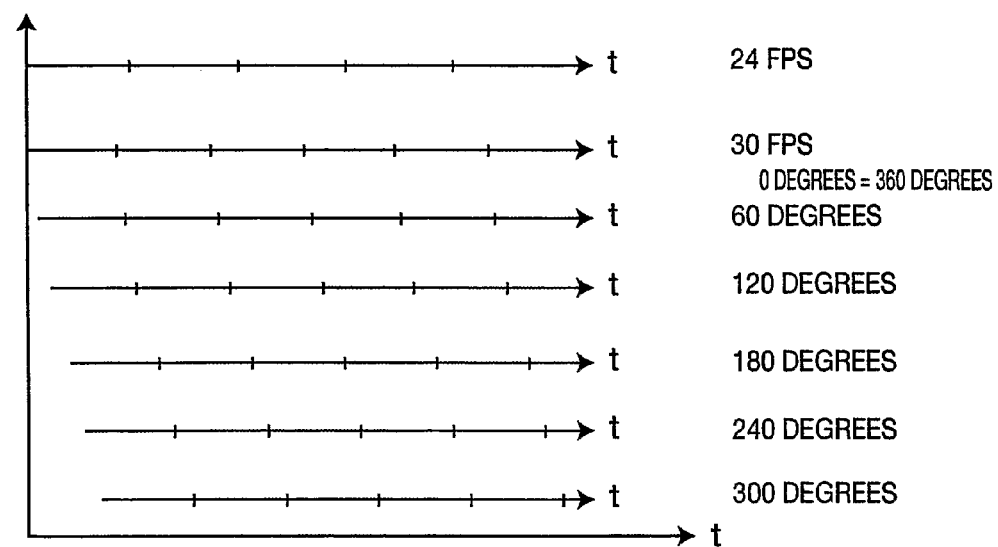
FIG. 3 shows the phase correlation of the digital cinema projector and a video camera/camcorder that illegally recorded video content.

FIG. 3 depicts the relation between projected 24 FPS and six phase relations to the illegal recorded frame: 0, 60, 120, 180, 240, 300 degrees, where 360 degrees=0 degrees. These combinations are implemented in two seconds. Please note that in the earlier explanation of the principles of the present invention a one second interval was used. In theory any time interval could be used. For example, a four second time interval could be used. This would, however, introduce flicker wherein the gaps are twice as far apart meaning that the protection would be reduced. It is believed, therefore, that the best mode is the use of a two second time interval. Using a two second interval and assuming a file speed of 24 FPS, means that there are 48 frames in the two second interval. Since six different phase gaps/differences are being used that means that are ⅙ (48) or 8 frames for each phase difference/gap. This further implies that four bit-plane frames are advanced (time-shifted forward) and four bit-plane frames are retarded (time-shifted backward).

In the first second of the time interval, three phase relations are implemented one after the other as follows:

Step 1. For the first eight frames, a 0 degree phase difference/gap between the projected content and the illegally recorded content is implemented back and forth, each lasting four frames Step 2. For the next eight frames, a 60 degree phase difference/gap between the projected content and the illegally recorded content is implemented back and forth, each lasting four frames Step 3. For the last eight frames of the first second a 120 degree phase difference/gap between the projected content and the illegally recorded content is implemented back and forth, each lasting four frames.

In the next second of the time interval, the other three phase relations are implemented one after the other as follows:

Step 4. For the first eight frames, a 180 degree phase difference/gap between the projected content and the illegally recorded content is implemented back and forth, each lasting four frames Step 5. For the next eight frames, a 240 degree phase difference/gap between the projected content and the illegally recorded content is implemented back and forth, each lasting four frames Step 6. For the last eight frames in this second of the time interval a 300 degree phase difference/gap between the projected content and the illegally recorded content is implemented back and forth, each lasting four frames Then the process repeats from the beginning until all bit-plane frames have been time shifted and projected in accordance with the above method.

Image-related flicker is fundamental to the present invention; it means that some objects in the picture will change their brightness from one frame to the next frame, when the illegal recording is reproduced. There is a threshold of visibility for this flicker in the HVS. The flicker is below the threshold of visibility in DC theatres, due to direct viewing of Pulse Width Modulated (PWM) image bit-planes. The illegally recorded movie, on the other hand, will first convert the PWM image bit-planes to video level via its optical sensors. Then the viewer of its image will notice the flicker, based on the level difference between neighboring frames.

It is assumed that the operator of the video camera that is recording/camcording illegally will know about the flicker-creating method and will try to reduce its effect by keeping the camera shutter open, or optimizing the camera exposure to the DC screen brightness. The efficiency of the present invention, though, is not affected by any camera function, since a camera would capture the gap because it uses its own frame-based sequence, while the HVS integrates the PWM pictures.

Figure 4:
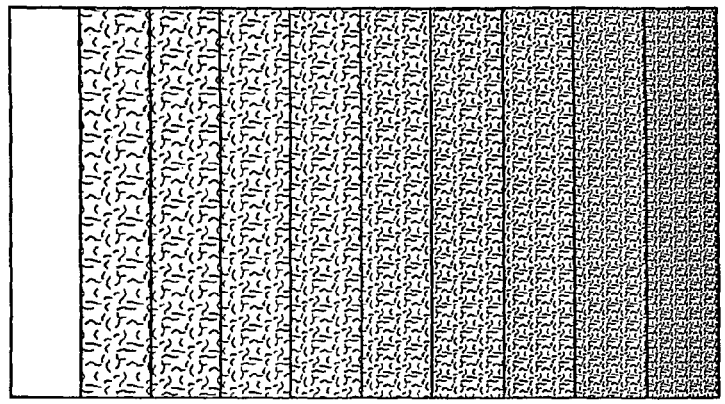
FIG. 4 shows a projection at a digital cinema contrasted with a projection reproduced from an illegal recording/camcording.
Figure 4:
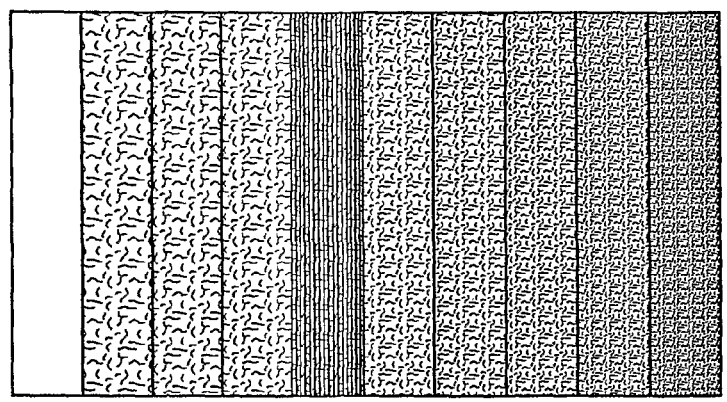

The top portion of FIG. 4 shows an example of a DC frame, where a test image is on the screen. This DC frame contains gradations of gray level bit-planes. The bottom portion of FIG. 4 shows the captured video image, missing the middle-scale gray level bit-planes. As indicated above, this occurs once every second.

Since the invention includes human operator involvement for selection of mid-scale bit-planes during the digital mastering process. The position of the mid-scale bit-planes on the screen could also be selected for the best protection.

Figure 5:
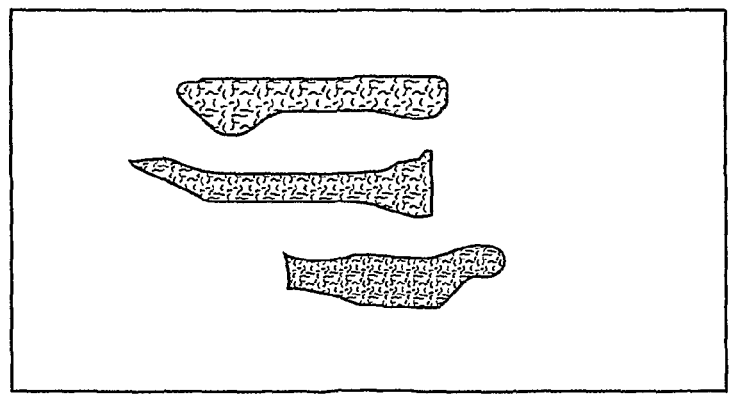
FIG. 5 illustrates the movement of the middle-scale bit-plane across the image frame.

FIG. 5 depicts different positions on the screen, where mid-scale bit-planes create frame gap. Thus, the flicker moves to a zone where it is more efficient.

Figure 6:
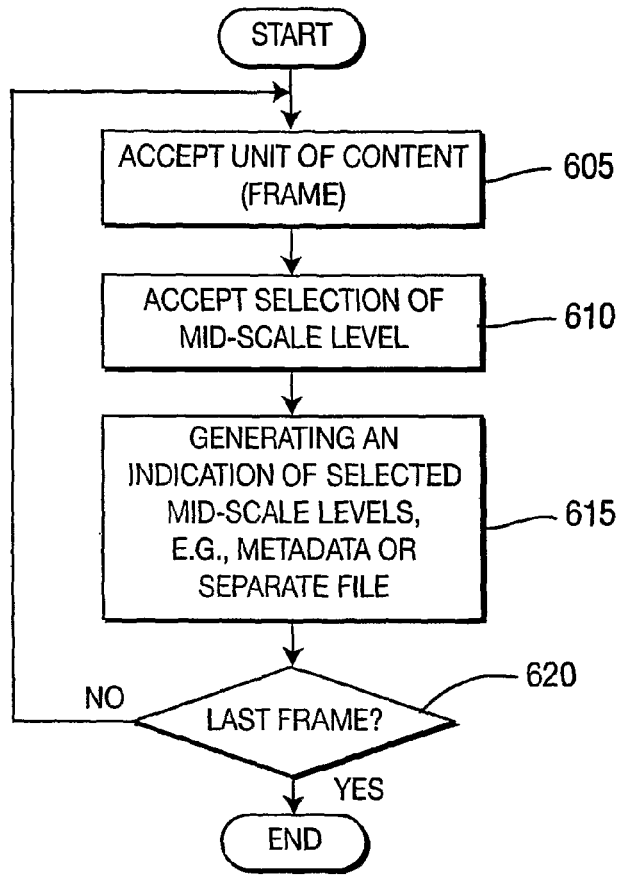
FIG. 6 is a flowchart of the method of the present invention at the mastering/authoring side.

FIG. 6 is a flowchart of the method of the present invention at the mastering/authoring side. At 605, a unit of content (frame) is accepted. An operator selects one or more mid-scale levels for the unit of content. This input is accepted at 610. At 615, an indication of the selected mid-scale level(s) is generated and recorded as meta-data or in a separate file. A separate file may provide better protection because the content and the mid-scale levels are separated. This is similar to the notion that a security key (or set of security keys) can be transmitted separately and may provide better protection if transmitted separately. At 620, a determination is made if this is the last unit of content. If this was the last unit of content then the process ends. If this was not the last unit of content the method repeats until all content has been processed.

Figure 7:
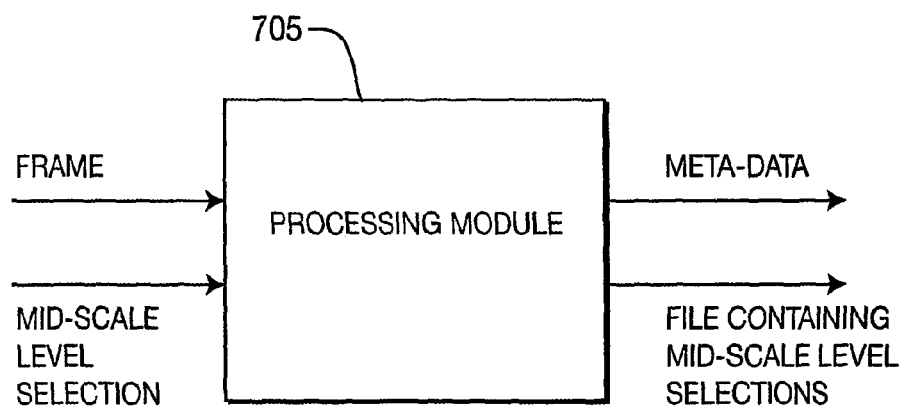
FIG. 7 is a block diagram of the present invention at the mastering/authoring side.

FIG. 7 is a block diagram of the present invention at the mastering/authoring side. Processing module 705 accepts content (frames) and also accepts the mid-scale level(s) selected by the operator and generates and records an indication of the selected mid-scale level(s) as meta-data or in a separate file.

Figure 8A:
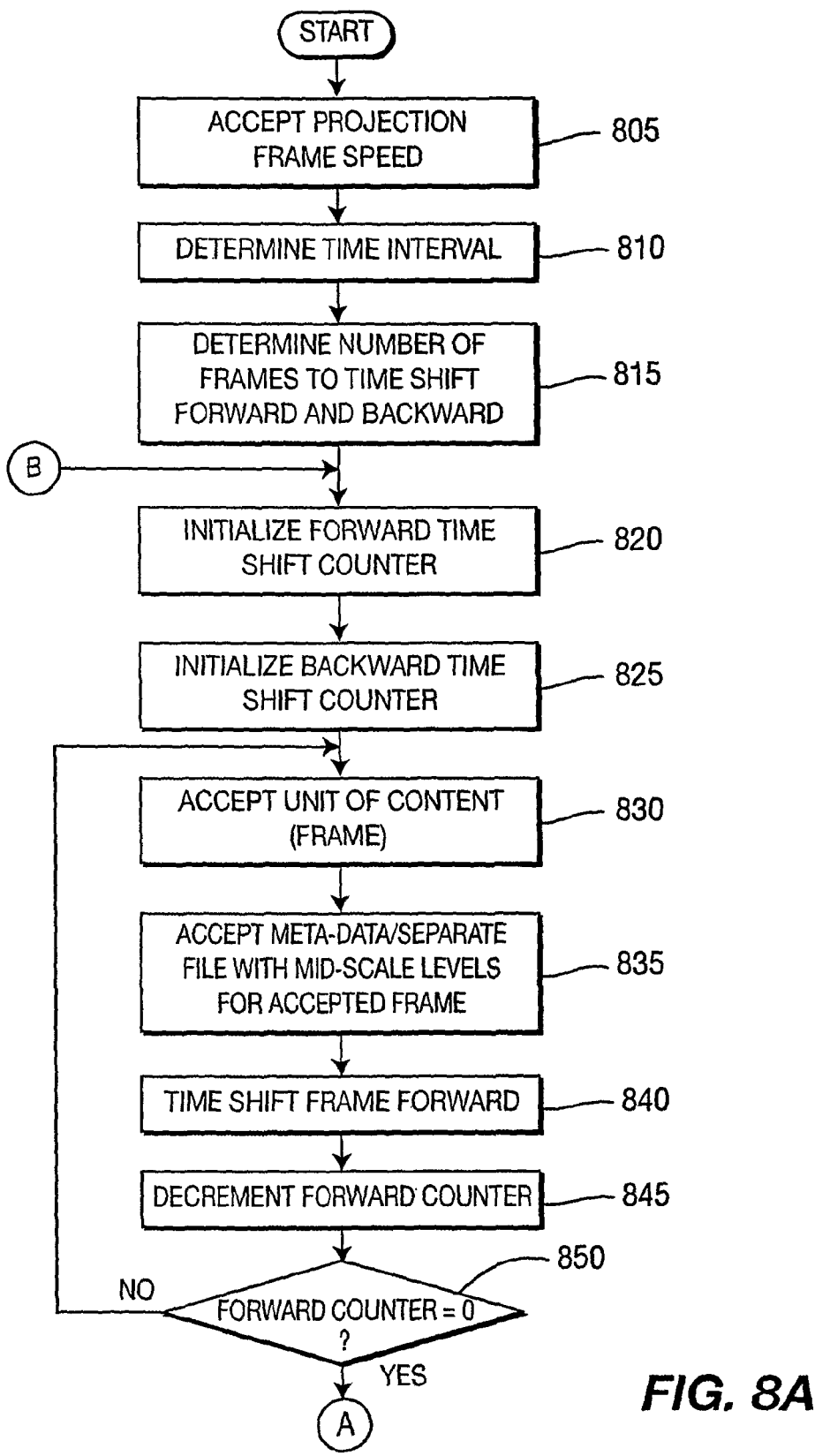
FIGS. 8A and 8B taken together are a flowchart of the method of the present invention at the projection side.
Figure 8B:
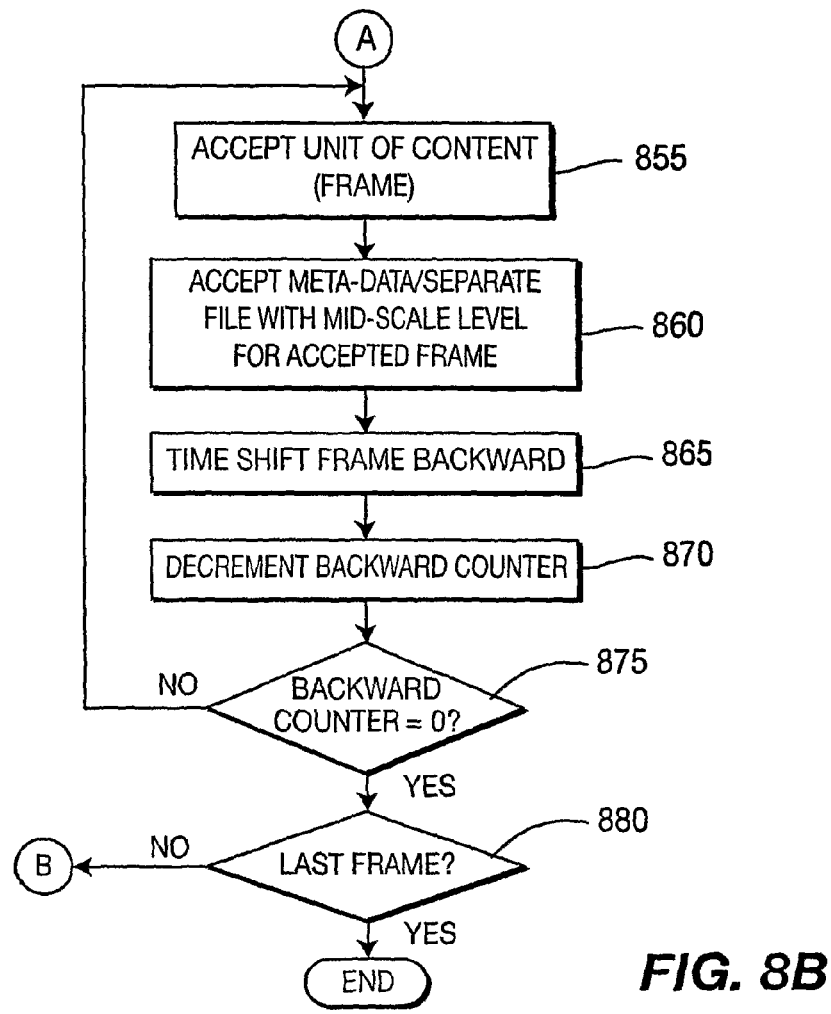

FIGS. 8A and 8B taken together are a flowchart of the method of the present invention at the projection side. Starting with FIG. 8A, at 805 a projection frame speed (FPS) is accepted. This is, as indicated above, typically 24 FPS or 48

FPS. A time interval is calculated/determined at 810. As indicated above, it is believed that a two second time interval is best. However, it is possible to use other time intervals. For example, a four second interval is possible but believed to provide less protection. At 815, the number of frames to be time-shifted forwards and backwards is calculated/determined based on the time interval selected. Thereafter, at 820 a forward counter is initialized to keep track of the bit-plane frames that are to be time shifted forward. It should be noted here that in this exemplary embodiment, a count-down counter has been used, which is later decremented and then tested. A count-up counter or any other form of counter or index could just as easily have been used. At 825, a backward counter is initialized to keep track of the bit-plane frames that are to be time shifted backward. A unit of content (frame) is accepted at 830. Then at 835, an indication of the operator selected mid-scale level(s) is accepted. The indicia of the selected mid-scale level(s) may be in the form of meta-data or in a separate file. The unit of content (frame) is time-shifted forward at 840. The forward counter is decremented at 845. A test is performed at 850 to determine if the forward counter has reached its limit. In this exemplary embodiment, that is a test to see if the forward counter is equal to zero. This indicates whether the appropriate number of bit-plane frames has been time-shifted forward and it is time to reverse the process and time-shift bit-plane frames backwards. If the appropriate number of bit-plane frames has not been time-shifted forwards then the process is repeated from 830.

If the appropriate number of bit-plane frames has been time-shifted forward then another unit of content (frame) is accepted at 855. Then at 860, an indication of the operator selected mid-scale level(s) is accepted. The indicia of the selected mid-scale level(s) may be in the form of meta-data or in a separate file. The unit of content (frame) is time-shifted backward at 865. The backward counter is decremented at 870. A test is performed at 875 to determine if the backward counter has reached its limit. In this exemplary embodiment, that is a test to see if the backward counter is equal to zero. This indicates whether the appropriate number of bit-plane frames has been time-shifted backward and it is time to reverse the process and time-shift bit-plane frames forwards. If the appropriate number of bit-plane frames has not been time-shifted forwards then the process is repeated from 855. A test is then performed at 880 to determine if this is the last unit of content (frame). If it is the last frame then the process ends. If this is not the last frame then the process continues with the forward and backward being initialized to perform the method of the present invention at the next phase. It should be noted that a counter or index could be used to keep track of the phase differences/gaps as well.

Figure 9:
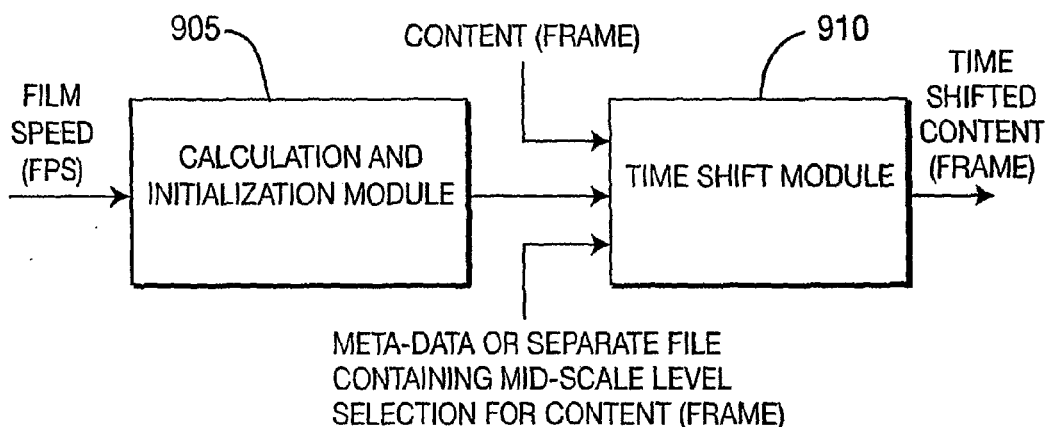
FIG. 9 is a block diagram of an exemplary embodiment of the present invention at the projection side.

FIG. 9 is a block diagram of an exemplary embodiment of the present invention at the projection side. Calculation and initialization module 905 accepts the film speed (FPS) and determines a time interval and the number of bit-plane frames to be time-shifted forwards and backwards. Calculation and initialization module 905 also initializes the forward and backward counters. Each of these functions could be performed in one or more separate modules or in this single module. Time-shift module 910 accepts units of content (one frame at a time) and the selected mid-scale level(s) and time-shifts the bit-plane frames forward by a phase difference. The operator selected mid-scale levels are accepted from meta-data or from a separate file. The forward counter is then decremented and tested to determine if the appropriate number of bit-plane frames has been time-shifted forwards. If not the process continues time-shifting the frames forward. If the appropriate number of frames has been time-shifted forward then another unit of content (frame) is accepted and this above process repeats in the backwards direction. Once the backwards time-shifting has been completed for the current phase difference then a test is performed to determine if the current frame is the last frame. If it is the last frame, then the process performed in time-shift module 910 done. If this is not the last frame then the process continues using the next phase difference/gap. A counter or index could additionally be used to keep track of the phase differences/gaps. Each of these functions could be performed in one or more separate modules or in this single module.

It should be noted that while the best mode to practice the invention is a projection apparatus, the invention could be practiced as an "add-on" device to a projection apparatus. The "add-on" device could be put in to the projection apparatus or be external to the projection apparatus but able to communicate with the projection apparatus.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for processing digital video content, said method comprising:
   receiving a frame of digital video content organized in bit-planes where each bit-plane corresponds to a respective sub-frame time within said frame;
   time-shifting a bit-plane of said frame of said digital video content by a phase amount, wherein said time-shifting is accomplished within said frame of said digital video content;
   projecting said frame having said time-shifted bit-plane;
   first repeating said receiving, said time-shifting and said projecting for a number of frames, wherein said time-shifting is in a forward direction for a first half of said number of frames and in a backward direction for a second half of said number of frames; and
   adjusting said phase amount within said frame of digital video content.

2. The method according to claim 1, wherein said receiving, said time-shifting, said projecting, said first repeating and said adjusting are repeated.

3. The method according to claim 1, further comprising accepting a pre-selected mid-scale level bit-plane for said received frame.

4. The method according to claim 3, wherein said mid-scale level is via meta-data.

5. The method according to claim 3, wherein said mid-scale level is via a separate file.

6. The method according to claim 2, further comprising:
accepting a video content projection speed;
calculating a time interval based on said projection speed; and
calculating a number of frames to be time-shifted forward and backward based on said time interval.

7. The method according to claim 2, further comprising:
initializing a forward time-shift counter;
initializing a backward time-shift counter; and
using said forward time-shift counter and said backward time-shift counter to control said time-shifting in said forward direction and said backward direction, respectfully.

8. An apparatus for processing digital video content, comprising:
a time shift module, receiving a frame of digital video content organized in bit-planes where each bit-plane corresponds to a respective sub-frame time within said frame;
said time shift module, time-shifting a bit-plane of said frame of said digital video content by a phase amount, wherein said time-shifting is accomplished within said frame of said digital video content;
a projector, projecting said frame having said time-shifted bit-plane;
repeatedly invoking said time shift module to receive said frame of digital video content organized in bit-planes where each bit-plane corresponds to a respective sub-frame time within said frame and to time-shift said bit-plane of said frame of said digital video content by said phase amount, wherein said time-shifting is accomplished within said frame of said digital video content, and repeatedly projecting said frame having said time-shifted bit-plane, wherein said time-shifting is in a forward direction for a first half of said number of frames and in a backward direction for a second half of said number of frames; and
said time shift module adjusting said phase amount within said frame of digital video content.

9. The apparatus according to claim 8, said time shift module accepting a pre-selected mid-scale level bit-plane for said received frame.

10. The apparatus according to claim 9, wherein said mid-scale level is via meta-data.

11. The apparatus according to claim 9, wherein said mid-scale level is via a separate file.

12. The apparatus according to claim 8, further comprising:
a calculation and initialization module, for accepting a video content projection speed;
said calculation and initialization module, calculating a time interval based on said projection speed; and
said calculation and initialization module, calculating a number of frames to be time-shifted forward and backward based on said time interval.

13. The apparatus according to claim 8, further comprising:
said calculation and initialization module, initializing a forward time-shift counter;
said calculation and initialization module, initializing a backward time-shift counter; and
said calculation and initialization module, using said forward time-shift counter and said backward time-shift counter to control said time-shifting in said forward direction and said backward direction, respectfully, said calculation module in communication with said time shift module.

14. The apparatus according to claim 8, wherein said apparatus is a digital projection apparatus.

* * * * *